United States Patent [19]

Nitsch et al.

[11] Patent Number: 4,627,719

[45] Date of Patent: Dec. 9, 1986

[54] METHOD AND APPARATUS FOR REPRODUCING THE IMAGES OF FILM FRAMES

[75] Inventors: Wilhelm Nitsch; Helmut Treiber, both of Munich; Gerhard Benker, Pullach, all of Fed. Rep. of Germany

[73] Assignee: Agfa-Gevaert Aktiengesellschaft, Leverkusen, Fed. Rep. of Germany

[21] Appl. No.: 778,613

[22] Filed: Sep. 20, 1985

[30] Foreign Application Priority Data

Oct. 10, 1984 [DE] Fed. Rep. of Germany ....... 3437222

[51] Int. Cl.⁴ ..................... G03B 27/52; G03B 27/32
[52] U.S. Cl. ........................................... 355/41; 226/9; 250/548; 355/54; 355/77
[58] Field of Search ............ 355/18, 50, 53, 54, 355/77, 38, 29, 41, 32; 354/105-109; 250/557, 559, 561, 571, 548; 226/2, 123, 9, 33

[56] References Cited

U.S. PATENT DOCUMENTS

| | | | |
|---|---|---|---|
| 3,572,925 | 3/1971 | Ables et al. | 355/54 X |
| 3,656,673 | 4/1972 | Erickson | 226/2 |
| 3,796,489 | 3/1974 | Sone et al. | 355/54 |
| 3,813,159 | 5/1974 | Schlegel, Jr. | 355/53 |
| 4,167,678 | 9/1979 | Mischo et al. | 250/559 |
| 4,174,174 | 11/1979 | Hunter, Jr. et al. | 355/54 X |
| 4,176,944 | 12/1979 | Payrhammer | 355/18 |
| 4,197,004 | 4/1980 | Hurlbut | 355/54 X |
| 4,279,502 | 7/1981 | Thurm et al. | 355/38 |
| 4,362,259 | 12/1982 | Stemme et al. | 226/123 |
| 4,422,752 | 12/1983 | Thurm et al. | 355/41 |

FOREIGN PATENT DOCUMENTS 3339958 5/1985 Fed. Rep. of Germany .

*Primary Examiner*—Richard A. Wintercorn
*Attorney, Agent, or Firm*—Peter K. Kontler

[57] ABSTRACT

Successive frames of an exposed and developed customer film are monitored during transport of the film in a first direction, and the information which is gathered during monitoring of discrete frames as well as of the entire film is stored in the memory of a microprocessor. The direction of travel of the film is then reversed and successive or selected frames of the film are copied during intervals between successive stepwise advances of the film in the second direction. Copying light which is used for the making of reproductions of images of the film frames is also used for illumination of film frames during monitoring. A mirror is provided to reflect light to the monitoring unit during travel of the film in the first direction, and such mirror is retracted preparatory to copying which starts with the last monitored frame and proceeds toward the first monitored frame of the film. The film is converted into a growing roll during monitoring of its frames.

31 Claims, 2 Drawing Figures

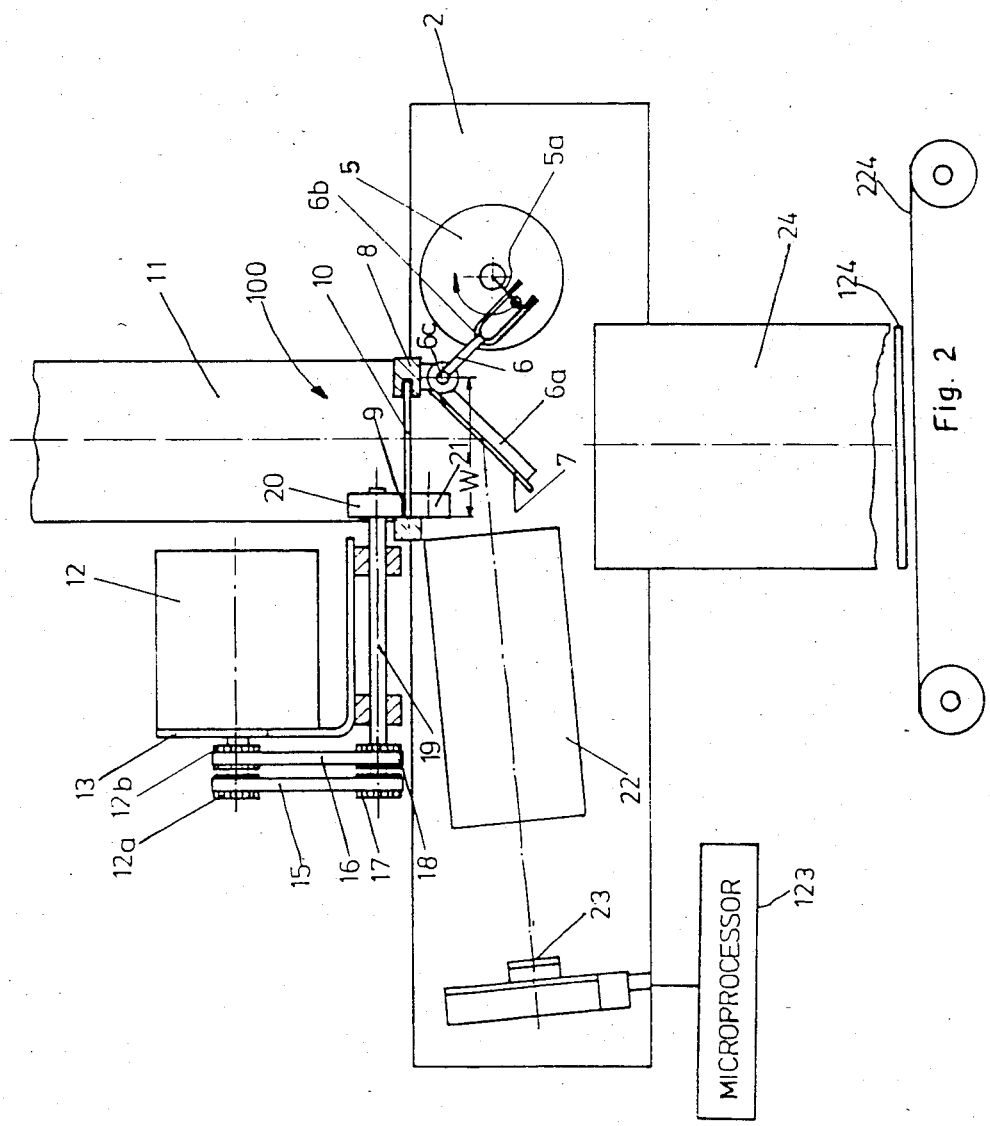

METHOD AND APPARATUS FOR REPRODUCING THE IMAGES OF FILM FRAMES

BACKGROUND OF THE INVENTION

The present invention relates to improvements in methods and apparatus for copying selected or successive sections of a series of sections on a length of photographic material, especially for reproducing the images of successive or selected film frames which form a web or strip of coherent exposed and developed film frames separated by frame lines.

It is already known to copy successive or selected frames of a series of coherent customer films on a web of photographic paper or the like in such a way that the characteristics of copying light are influenced by a number of parameters, particularly by the parameters of individual film frames as well as by one or more parameters of the entire customer film. Reference may be had to commonly owned U.S. Pat. No. 4,279,502 granted July 21, 1981 to Siegfried Thurm et al. which discloses a method and an apparatus for copying successive film frames of a series of customer films which are spliced together to form an elongated web. The web is transported longitudinally from a supply reel to a takeup reel, and successive frames are monitored in a first portion of the elongated path between the two reels in order to gather information pertaining to the parameters of individual frames, and such information is thereupon used to influence the copying operation in a second portion of the same path between the first portion and the takeup reel. The means for monitoring the film frames in the first portion of the path is associated with means for monitoring one or more parameters of an entire customer film, and the thus obtained information is also utilized to influence the copying of the respective film frames. Therefore, the distance between the first and second portions of the path must exceed the length of the longest customer film in the web in order to ensure that the parameter or parameters of the entire customer film will be monitored and the thus gathered information will be available first for evaluation and thereupon for regulation of the copying operation before the foremost frame of the freshly monitored customer film reaches the copying station. A magazine can be provided for temporary storage of a progressively increasing length of a customer film between the monitoring and copying stations while such film is being monitored for the generation and storage of signals which are indicative of the characteristics (e.g., density) of successive frames as well as of the characteristics of the entire customer film. This renders it possible to reduce the distance between the monitoring and the copying stations. A microprocessor is preferably utilized to evaluate the stored signals and to transmit appropriate signals to the copying unit when the respective frames of the customer film which was temporarily stored between the two stations reach the copying station. The microprocessor can ascertain the presence or absence of color dominants in any one of the three primary colors and can influence the exposure of successive film frames to light in the three colors in dependency on the characteristics of signals which are indicative of the parameters of a film frame as well as in dependency on the characteristics of signals which are indicative of one or more parameters of the entire customer film.

An advantage of the just discussed method is that it renders it possible to process a large number of film frames and customer films per unit of time because the monitoring operation takes place simultaneously with the copying operation. However, the practice of such method also necessitates the utilization of highly complex and expensive copying machines which can reproduce the images of successive acceptable film frames at a rate at least approaching the output of the mcnitoring device. Moreover, the utilization of a high-speed and highly complex copying machine is not always desirable and/or necessary, especially if the copies of film frames are to be developed simultaneously with copying. The developing machines cannot keep pace with modern copying machines.

OBJECTS AND SUMMARY OF THE INVENTION

An object of the invention is to provide a novel and improved method of copying successive sections of a series of coherent sections of a length of photographic material in such a way that the monitoring of the parameters of an entire or full length of photographic material (such as an entire customer film) can be taken into consideration even though the frequency at which the images of the sections are reproduced on photographic paper or the like is a small fraction of the frequency at which the sections are monitored by a modern high-speed monitoring unit.

Another object of the invention is to provide a method which renders it possible to take full advantage of presently known high-speed film frame and customer film monitoring techniques in conjunction with a copying operation which is carried out at a relatively small fraction of the frequency of the monitoring operation.

A further object of the invention is to provide a novel and improved apparatus for the practice of the above outlined method.

An additional object of the invention is to provide an apparatus which occupies little room, which can rapidly monitor successive frames of a customer film as well as the entire customer film, which employs a relatively simple and inexpensive copying device, and wherein several constituents of the copying device can perform useful functions in the course of the monitoring operation.

Still another object of the invention is to provide the apparatus with novel and improved means for advancing a series of coherent sections of a length of photographic film in the course of the monitoring and copying operations.

Another object of the invention is to provide the apparatus with a novel and improved copying device.

A further object of the invention is to provide an apparatus which enables the attendant or attendants to perform one or more tasks in the course of copying of successive acceptable sections of a length of photographic material.

One feature of the invention resides in the provision of a method of copying successive image carrying sections of a series of coherent sections on a length of photographic material (e.g., on a single customer film or on a series of spliced-together customer films). The method comprises the steps of advancing the length of photographic material longitudinally in a first direction, individually photoelectrically monitoring predetermined parameters of successive sections of the series in the course of the advancing step and generating and storing signals denoting characteristic values which are representative of the predetermined parameters, thereupon transporting the length of photographic material longitudinally in a second direction counter to the first direction, and reproducing the images of some or all of the sections in the course of the transporting step starting with the last monitored section. The reproducing step includes exposing the sections to copying light and influencing the copying light as a function of the corresponding stored signals.

The advancing step preferably includes moving the length of photographic material along a predetermined path, and the monitoring step preferably includes monitoring the parameters of successive sections in a predetermined portion of the path. The transporting step then preferably includes moving the length of photographic material along the path and the reproducing step then includes exposing the sections to copying light in the predetermined portion of the path. This renders it possible to utilize one and the same source of light for copying as well as in connection with monitoring of the sections.

The method can further comprise the step of photoelectrically ascertaining a predetermined parameter of the entire length of photographic material in the course of the advancing step and generating and storing an additional signal a characteristic value of which is indicative of the parameter of the entire length of photographic material. The influencing step then further includes influencing the copying light as a function of the additional signal so that the copier can take into consideration the parameters of individual sections as well as the parameter of the entire length of photographic material.

The method preferably also comprises the step of temporarily storing the length of photographic material upon completion of the advancing step and prior to start of the transporting step. This can be achieved by converting successive monitored sections of the length of photographic material into a growing roll in the course of the advancing step.

The transporting step can include moving the length of photographic material stepwise, and the exposing step preferably takes place during the intervals of dwell of photographic material between successive stepwise movements in the second direction.

Another feature of the invention resides in the provision of an apparatus for copying successive image carrying sections of a series of coherent sections on a length of photographic material. The apparatus comprises a transporting unit including means for advancing the length of photographic material longitudinally along a predetermined elongated path in opposite first and second directions, means for individually photoelectrically monitoring predetermined parameters of successive sections of the series during movement of such sections in the first direction (such monitoring means includes means for generating and storing signals denoting characteristic values which are representative of the predetermined parameters), and means for reproducing the images of some or all of the sections during advancement of the sections in the second direction, starting with the last monitored section and proceeding toward the first monitored section. The reproducing means includes a source of copying light, means for directing copying light from the source upon successive or selected sections of the length of photographic material, and means for influencing the copying light as a function of the corresponding stored signals.

The apparatus further comprises a support which is adjacent to a predetermined portion of the path and carries the advancing means for the length of photographic material. The apparatus preferably also comprises a receptacle for temporary storage of the length of photographic material in preferably convoluted or meandering condition adjacent to one end of the path. The advancing means then comprises means for withdrawing successive sections of the length of photographic material from the receptacle. The latter can include a hollow cylinder, and the inner diameter of the hollow cylinder preferably equals or at least slightly exceeds 2 W wherein W is the width of the length of photographic material.

The aforementioned directing means of the image reproducing means preferably includes means for directing light upon successive sections of the length of photographic material in the predetermined portion of the path, and the monitoring means preferably includes means for monitoring successive sections of the length of photographic material in such predetermined portion of the path. As mentioned above, this renders it possible to use the aforementioned light source in connection with the copying of some or all of the sections during advancement of the length of photographic material in the second direction as well as in connection with monitoring of successive sections during advancement of the length of photographic material in the first direction. The monitoring means can include means for activating the light source during monitoring of successive sections in the predetermined portion of the path so that such source illuminates the sections which are being monitored during advancement of the length of photographic material in the first direction.

The reproducing means further includes means for focusing light which has passed through successive or selected sections of the length of photographic material, and the directing and focusing means are preferably disposed at the opposite sides of the path. Such apparatus further comprises light intercepting means (e.g., a totally deflecting pivotable mirror) and means for moving the intercepting means between a first position in which the intercepting means is located between the path and the focusing means and prevents light from reaching the focusing means and a second position in which the focusing means receives light that has passed through a section of the length of photographic material. The moving means can comprise an electromagnet and a transmission which is interposed between the electromagnet and the intercepting means and serves to move the intercepting means in response to changes in the condition (i.e., energization or deenergization) of the electromagnet. The latter can constitute a rotary electromagnet, and the transmission can constitute a so-called dead center transmission. The electromagnet can be activated by the advancing means to effect the movement of the intercepting means to the first position only while the advancing means advances successive sections of the length of photographic material in the first direction.

The advancing means can comprise reversible motor means, a first material advancing unit at one side and a second material advancing unit at the other side of the predetermined portion of the path, as considered in the first and second directions, the advancing means then preferably further comprises means for transmitting motion from the motor means to the two units. Each of these units can comprise at least one roller and the advancing means preferably further comprises a rocker which supports the two units and is pivotable about a predetermined axis between a first position in which one of the two units engages and advances the length of photographic material and a second position in which the photographic material is advanced by the other unit. The motor means can be mounted on the rocker and the apparatus can comprise means for pivoting the rocker about the predetermined axis. Such pivoting means can comprise an electromagnet. In accordance with a presently preferred embodiment of the invention, each of the aforementioned units comprises an idler roller which is disposed at one side of the path and a driven roller which is located at the other side of the path and is moved against the respective idler roller in response to pivoting of the rocker to the corresponding position.

The apparatus preferably further comprises sensor means which is adjacent to the path and serves to generate signals in response to detection of the trailing end of the length of photographic material during advancement of the material in the first direction. The motor means is then operative to reverse the direction of advancement of the length of photographic material from the first to the second direction in response to a signal from the sensor means. The sensor means is preferably adjacent to one of the two units.

Still further, the apparatus can comprise sensor means which is adjacent to the path and serves to generate signals in response to detection of the leader of the length of photographic material during advancement of the material in the second direction. The motor means is then designed to shift from transmission of motion to one of the units to transmission of motion to the other unit in response to signals from such sensor means. The aforementioned receptacle is preferably adjacent to one end of the path to receive successive sections of the length of photographic material during advancement in the first direction. The one unit is then disposed between the predetermined portion of the path and the receptacle.

If the length of photographic material is provided with indicia (e.g., with notches) denoting the positions of the sections, the apparatus can comprise sensor means for generating signals in response to detection of successive indicia and the advancing means is then designed to advance the material in the first and second directions in response to signals from such sensor means.

The apparatus can further comprise means defining an observation opening with a film frame indicator, a constant-speed material moving device and an indicia applying device in the region of one of the advancing units, preferably the advancing unit 29, 30.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a sectional view as seen in the direction of arrows from the line II—II of FIG. 1.

DESCRIPTION OF THE PREFERRED EMBODIMENTS

Figure 1:
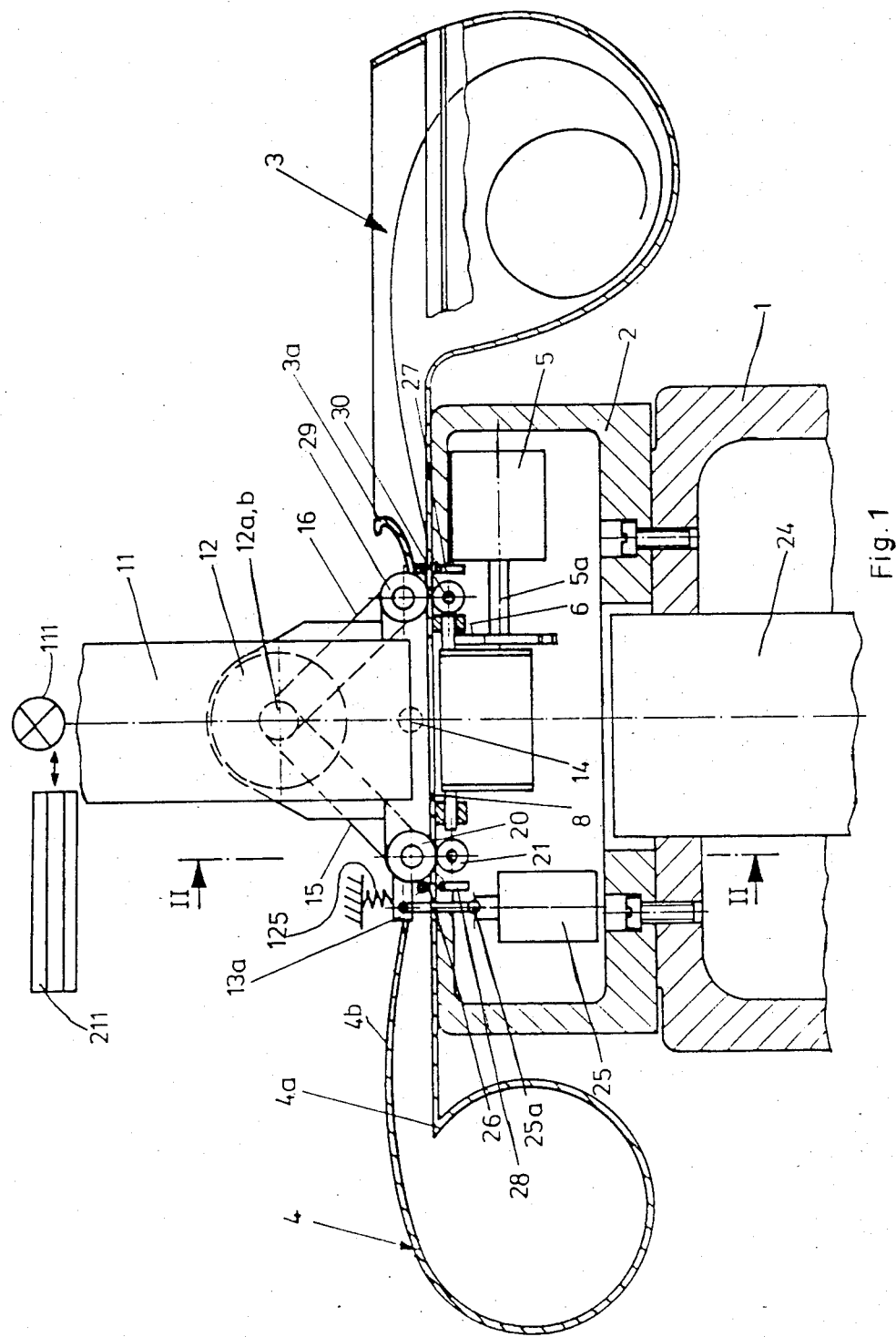
FIG. 1 is a vertical sectional view of an apparatus which embodies one form of the invention.

The apparatus which is shown in FIGS. 1 and 2 comprises a support including a frame or base 1 and a platform 2 which is bolted to the top portion of the base 1 and carries and advancing device or transporting unit for a length 10 of photographic film such as shown, for example, in FIG. 1 of commonly owned U.S. Pat. No. 4,362,259 to Stemme et al. The platform 2 is hollow in the middle and defines a copying station 100 occupying a predetermined portion of the path which is defined by the apparatus for transport of the length 10 of photographic material (e.g., an exposed and developed customer film) from a first receptacle 3 at one end to a second receptacle 4 at the other end of the path. The receptacle 3 can constitute a hollow partially cylindrical vessel which is open at the top so that a roll of customer film 10 can be dropped into its interior. The left-hand end portion 3a of the receptacle 3 extends close to the copying station 100 and constitutes a funnel which directs successive increments of the film 10 into the nip of two rollers 29, 30 constituting one film advancing unit of the advancing device, or from such nip into the major portion of the receptacle 3. The film advancing device further comprises a second film advancing unit including two rollers 20, 21 which are spaced apart from the rollers 29, 30 as considered in the direction of longitudinal movement of the film 1 between the receptacles 3 and 4. The copying station 100 between the advancing units 20, 21 and 29, 30 accommodates two parallel guide rails 8 and 9 for the two marginal portions of the film 1. Each of the guide rails 8 and 9 has a substantially U-shaped profile with the two flanges disposed in substantially horizontal planes one above the other so that each marginal portion of the film between the units 20, 21 and 29, 30 can extend into the horizontal groove which is defined by the respective guide rail. The rollers 20, 21 and 29, 30 of the two film advancing units are adjacent to the rear guide rail 9 (as viewed in FIG. 1) and the guide rail 9 has suitable cutouts or recesses which enable the rollers to come into actual contact with successive increments of the respective marginal portion of the film 10. The rails 8 and 9 can be said to define a copying window wherein copying light issuing from a source 111 can pass through successive frames of the film 10 to impinge upon a vario-objective 24 constituting a means for focusing the copying light onto photographic paper in a manner as shown in FIG. 1 of the aforementioned patent to Stemme et al.

The left-hand end portions of the guide rails 8 and 9 (as viewed in FIG. 1) terminate at or actually merge into the channel-shaped extension 46 of the receptacle 4. The latter is preferably a hollow cylinder whose inner diameter equals or exceeds 2 W wherein W is the width of the film 10. Such dimensioning of the interior of the receptacle 4 ensures that the latter can readily receive a full length of 36 mm customer film (e.g., a film having a total of 36 frames). The height of the channel which is defined by the substantially trumpet-shaped portion or extension 4b of the receptacle 4 increases in a direction away from the guide rails 8 and 9. This reduces the likelihood of scratching of the film 10 during transport from the receptacle 4 back into the interior of the receptacle 3. In order to further reduce the likelihood of scratching of the film 10 during transport into or from the interior of the receptacle 4, the transversely extending tongue 4a of the receptacle 4 is preferably provided with a centrally located recess (not specifically shown) whose width matches or slightly exceeds the width W of the film 10 and whose deepmost portion is bounded by a suitably curved (e.g., convex) surface. The configuration of the surface bounding the recess in the tongue 4a can be such that the tongue does not contact the emulsion side of the film 10 in the region which includes the film frames. If desired, the receptacle 4 can contain a suitable winding or convoluting spring (not specifically shown) to promote the conversion of film 10 into a roll of convoluted photographic material during introduction of successive film frames from the channel in the extension 4b into the main portion of the interior of the receptacle 4.

A sensor 27 (e.g., a photocell) is installed in the apparatus outwardly adjacent to the advancing unit 29, 30 to monitor successive increments of the film 10 and to generate a signal in response to detection of the leader of the film 10 due to the fact that the leader reflects more or less light than the foremost film frame. A second sensor 28 (e.g., a second photocell) is outwardly adjacent to the advancing unit 20, 21 to generate a signal in response to detection of the leading or trailing end of the film 10. The sensors 27 and 28 transmit signals to the advancing device of the improved apparatus.

The advancing device includes the aforementioned film advancing units 20, 21 and 29, 30, a reversible electric stepping motor 12, endless belt transmissions 15, 16 for transmitting motion from the output element of the motor 12 to the driven rollers 20 and 29, respectively, and a rocker 13 which supports the motor 12 and the rollers 20, 29 and is pivotable about the axis of a horizontal shaft 14 on the platform 2. The motor 12 is mounted on the rocker 13 centrally between the rollers 20, 29 whose axes are parallel to the axis of the shaft 14 and which are disposed at the upper side of the path for the film 10. The rollers 20 and 30 are idler rollers and are mounted in or on the platform 2 at a level below the aforementioned path.

The transmissions 15 and 16 preferably employ internally toothed belts which are respectively trained over toothed pulleys 12a, 12b on the output element of the motor 12. The belt of the transmission 15 is further trained over a toothed pulley 17 on the shaft 19 of the roller 20, and the belt of the transmission 16 is further trained over a toothed pulley 18 on the shaft of the roller 29.

The means for tilting or pivoting the rocker 13 between two end positions comprises an electromagnet 25 which is mounted in or on the platform 2 and is energizable or denergizable to pivot the rocker 13 in a clockwise direction, as viewed in FIG. 1, against the opposition of a coil spring 125 or any other suitable resilient means for permanently but yieldably urging the rocker 13 in a counterclockwise direction, i.e., toward engagement of the roller 20 with the idler roller 21 or with the respective marginal portion of the film 10. The connection between the armature of the electromagnet 25 and the extension 13a of the rocker 13 comprises a link 26 and a pivot pin 25a. The arrangement is preferably such that, when the electromagnet 25 is energized, it causes the rocker 13 to engage the roller 29 with the idler roller 30 or with the adjacent marginal portion of the film 10; at the same time, the roller 20 is lifted above and away from the idler roller 21 and the coil spring 125 stores energy. The width of the gap between the rollers 20, 21 or 29, 30 is or can be barely sufficient to ensure that the film 10 can advance between the rollers 20, 21 without undergoing any braking action while the rollers 29, 30 are in the process of advancing the film or vice versa. The spring 125 is free to pivot the rocker 13 in a counterclockwise direction, as viewed in FIG. 1, as soon as the electromagnet 25 is deenergized whereby the roller 29 is lifted above and away from the roller 30 and the roller 20 is simultaneously lowered toward engagement with the roller 21 or with the film 10.

The copying device of the improved apparatus includes the aforementioned light source 111, the aforementioned focusing means (objective 24), a light mixing duct 11 which directs light from the source 111 toward successive frames of the film 10 at the copying station 100 between the advancing units 20, 21 and 29, 30 and a set 211 of mobile color filters which can be caused to move into and from the path of copying light upstream of the copying station 100. The arrangement is such that the copying device reproduces the images of successive or selected film frames onto photographic paper 224 at a level below the focusing means 24, as viewed in FIG. 2, during the intervals between stepwise advances of the film 10 in a (second) direction from the receptacle 4 toward the receptacle 3. When the film 10 is advanced in the opposite (first) direction from the receptacle 3 toward and into the receptacle 4 to form in the latter a gradually growing roll of convoluted film frames, the objective 24 cannot receive copying light from the duct 11 due to the provision of an intercepting means in the form of a mirror 7 which is installed at a level below the guide rails 8, 9 between the duct 11 and the objective 24 and can be pivoted to and from the operative position of FIG. 2 by a moving means comprising a rotary electromagnet 5 and a dead center transmission including a bell crank lever 6 having a bifurcated portion or arm 6b for the eccentric output element 5a of the electromagnet 5 and a second arm 6a which supports the mirror 7 and is pivotable about the axis of a horizontal shaft 6c at a level below the guide rail 8. When the mirror 7 is held in the operative position of FIG. 2, it makes an angle of approximately 45 degrees with the plane of the film frame at the copying station 100 and directs the light which has passed through such frame against a vario objective 22 which images the film frame onto a battery of photocells together constituting a photoelectric monitoring unit 23 whose output is connected with the input of an evaluating circuit 123, e.g., a suitable microprocessor. For example, the monitoring unit 23 can comprise a row of ten photocells each of which is sensitized in one of three primary colors. The outputs of the cells are addressed by the microprocessor 123 at a rate which is related to the speed of transport of a film frame through the copying station 100 while the mirror 7 is held in the angular position of FIG. 2. The characteristic values of each film frame are monitored in each of the three colors for each (preferably square) unit area of the film frame. Reference may be had to the commonly owned German Offenlegungsschrift No. 33 39 958 which discloses a suitable monitoring arrangement for successive frames of a customer film or a series of coherent customer films.

The shaft 6c for the bell crank lever 6, one arm (6a) of which supports the mirror 7 and the other arm of which constitutes the bifurcated portion 6b in engagement with the eccentric output element 5a of the rotary electromagnet 5, can be mounted directly on and at the underside of the guide rail 8. An advantage of the illustrated so-called dead center transmission including the lever 6 and the output element 5a is that it can pivot the mirror 7 without any shaking as well as that it can move the mirror to two accurately determined end positions with a high degree of accuracy and reproducibility. This is particularly important for that end position of the mirror 7 which is shown in FIG. 2, i.e., in which the mirror directs light toward the objective 22 and the monitoring unit 23.

If the armature of the rotary electromagnet 5 is rotated through approximately 90 degrees in a clockwise direction, as viewed in FIG. 2, the mirror 7 is pivoted out of the way so that it allows copying light which has passed through a film frame at the station 100 to propagate itself toward the objective 24 which focusses such light upon photographic paper 224.

An important advantage of the feature that the source 111 transmits light for the making of reproductions of images of the film frames as well as that light which is needed for monitoring the characteristics of successive film frames during advancement of the film 10 from the receptacle 3 toward the receptacle 4 is that this contributes to simplicity and compactness of the apparatus and ensures that the apparatus need not compensate for eventual differences between the intensities of light beams which are emitted by two discrete sources as is customary in conventional apparatus.

The improved apparatus further comprises additional sensor means (not shown in the drawing) which serves to generate signals in response to detection of indicia (e.g., notches) in one marginal portion of the film 10. Such signals are used to arrest the motor 12 at the instant when a film frame is in exact register with the duct 11 and the objective 24. The sensor which monitors the indicia in one marginal portion of the film 10 can include a mechanical monitoring device of an optical monitoring device of the type shown in FIG. 1 of the aforementioned patent to Stemme et al. Alternatively, the apparatus can employ a notch detector of the type disclosed in commonly owned U.S. Pat. No. 4,176,944 to Payrhammer.

Still further, the apparatus can be equipped with means for monitoring the frame lines between successive frames of the film 10 and with means for providing the film with indicia in response to automatic detection of frame lines. Reference may be had to commonly owned U.S. Pat. No. 4,167,678 granted to Mischo et al. The apparatus can be equipped too, with a film feed control of the type disclosed in U.S. Pat. No. 3,656,674. The mode of operation of the improved apparatus is as follows:

The attendant places a roll of customer film 10 into the receptacle 3 in such a way that the emulsion side of the film faces upwardly. The attendant then grasps the leader of the film 10 and inserts it into the nip of the rollers 29, 30. The photocell 27 detects the leader of the film 10 and energizes the electromagnet 25 so that the roller 29 descends toward the roller 30 and the signal from the photocell 27 also starts the motor 12 in a direction to cause the advancing unit 29, 30 to push successive increments of the film 10 toward and into the copying station 100. The motor 12 rotates the roller 29 at a constant speed while the rotary electromagnet 5 causes the transmission 5a, 6 to maintain the mirror 7 in the position of FIG. 2 so that light which issues from the source 111 and passes through the duct 11 and thereupon through successive increments of a film frame at the station 100 is directed toward the objective 22 and hence against the photocells of the monitoring unit 23. At such time, the film 10 advances in the first direction (from the receptacle 3 toward and into the receptacle 4). The objective 22 images successive strip-shaped portions of a film frame onto the photocells of the monitoring unit 23 which transmits appropriate signals to the microprocessor 123. As mentioned above, the rate at which the microprocessor 123 processes signals which are transmitted by the photocells of the monitoring unit 23 is proportional to the rate at which the rollers 29, 30 advance successive increments of a film frame toward the receptacle 4. This ensures gap-free scanning of the entire film frame and proper memorizing of signals which are indicative of the monitored characteristics of the film frame.

Monitoring of notches or holes in the marginal portion or portions of the film 10 results in the generation of signals which can be used to interrupt the memorizing of signals which are generated as a result of monitoring of certain portions of the film 10. For example, the transmission of signals to the microprocessor 123 can be interrupted during scanning of a frame line.

The photocell 28 transmits a signal in response to detection of the leader of the film 10, and such signal is used to deenergize the electromagnet 25 so that the spring 125 is free to pivot the rocker 13 in a counterclockwise direction, as viewed in FIG. 1, and causes the unit including the rollers 20, 21 to pull successive increments of the film 10 from the copying station 100. The direction of rotation of the output element of the motor 12 (and hence of the pulleys 12a and 12b) remains unchanged. An advantage of such changeover from transport with the rollers 29, 30 to transport with the rollers 20, 21 in the first direction (toward the receptacle 4) is that the film 10 can be advanced (pulled) through the copying station 100 with a higher degree of accuracy.

If the shifting over from pushing to pulling affects the predictability of the monitoring operation by the means 22, 23, 123 the signal which is generated by the photocell 28 is delayed so that it effects a deenergization of the electromagnet 25 only when the next frame line is in the range of the monitoring means. The light source 111 is on during transport of the film 10 from the receptacle 3 toward the receptacle 4 so that the film frame at the copying station 100 is properly illuminated by way of the duct 11. The color filters 211 are located outside of the path of light which issues from the source 111 and is used to illuminate successive film frames at the station 100 while the frames are being monitored by the monitoring means 22, 23, 123. The apparatus can further comprise a suitable shutter 124 which is closed when the mirror 7 is held in the position of FIG. 2 to further reduce the likelihood of penetration of light into the path of photographic paper 224 while the characteristics of a film frame are monitored and the corresponding signals are stored in the microprocessor 123 for utilization in the course of the respective copying operation.

The apparatus continues to monitor successive frames of the film 10 until the photocell 27 generates a signal denoting detection of the trailing end of the film 10. If necessary, the signal which is generated by the photocell 27 is delayed to ensure complete scanning of the last film frame, and such signal is thereupon utilized to reverse the direction of rotation of the motor 12 while the angular position of the rocker 13 remains unchanged, i.e., the spring 125 continues to bias the roller 20 toward the roller 21 while the rollers 29, 30 define a gap for unimpeded or practically unimpeded passage of the film therethrough. The rollers 20, 21 then begin to draw the film from the receptacle 4 and push successive increments of the film into the the copying station 100. At the same time, the controls of the motor 12 are connected with the output of the sensor which monitors the indicia in one marginal portion of the film 10 so that the motor comes to a halt whenever a frame which requires copying is properly located at the copying station 100. It will be noted that the last monitored film frame is the first to return to the copying station 100 and is the first to be imaged onto photographic paper 224 below the objective 24.

The electromagnet 5 is energized to retract the mirror 7 from the path of copying light as soon as the monitoring of the last film frame is completed. The copying of the film frame at the station 100 takes place in response to opening of the shutter 124.

The source 111 emits white light, and such light is permitted to impinge upon a film frame at the station 100 for an interval of time which is determined by a signal from the microcomputer 123. At first, the photographic paper 224 is exposed to white light and such exposure is followed by exposure to light in one or more colors determined by that complementary color filter or those color filters of the set 211 which are caused to enter the path of light between the source 111 and the light duct 11. The shutter 124 is closed upon completion of an exposure in the three colors and the motor 12 is set in motion to advance the film 10 in a direction toward the receptacle 3 so as to locate the next acceptable film frame at the copying station 100. The manner in which color filters can be moved into and from the path of light between the light source and the path for photographic paper is disclosed, for example, in commonly owned U.S. Pat. No. 4,422,752 to Thurm et al.

When the leader of the film 10 reaches the photocell 27, the latter energizes the electromagnet 25 which tilts the rocker 13 so that the roller 20 is lifted above and away from the roller 21 and the roller 29 cooperates with the roller 30 to pull the film 10 through the copying station 100. If the photographic paper 224 is developed simultaneously with and at the rate at which the frames of the film 10 are copied, the intervals between successive copying operations can be rather long. Such intervals are utilized to advance the film 10 by a step so as to place the next frame into the path of copying light as well as to advance the strip of copying paper 224. Due to the very pronounced accuracy of the monitoring operation which preferably involves not only a monitoring of discrete film frames but also the monitoring of one or more parameters of the entire film 10, the copying operation need not be monitored by the attendant who is or can be present for monitoring of successive film frames during transport of the film 10 from the receptacle 3 toward the receptacle 4. Therefore, such person has ample time to perform other tasks, such as inspecting the developed prints as well as inserting the prints into customer envelopes and writing down the cost of the order. Thus, the operation of the improved apparatus need not be monitored by one or more attendants, at least during certain stages of operation such as the copying of acceptable film frames on photographic paper or the like. This contributes to lower cost of the prints.

If desired, the guide rail 8 and/or 9 can be adjustably mounted in the support including the base 1 and the platform 2 so that one and the same pair of guide rails can be used for accurate guidance of narrower, medium wide or very wide customer films. Alternatively, the apparatus can be furnished with two or more sets of guide rails, one set for each type of film. This will depend, at least to a certain extent, on the position of various sensors for different types of film.

The microcomputer 123 can be of the type known as Falcon (manufactured by Digital Equipment). It also serves for temporary storage of various signals as well as for the transmission of signals which are used to regulate the exposure of successive film frames to light including the transmission of signals which are used to move selected filters of the set 211 into and from the light path. The microprocessor 123 preferably also serves to accept and evaluate signals which are generated by the photocells 27, 28 as well as signals from the sensor or sensors for indicia in one or both marginal portions of the film.

The microprocessor 123 can further store and transmit necessary signals which are transmitted thereto at the initiative of the person in charge in order to make special copies of certain film frames, to make several copies of certain film frames, to skip the copying of certain film frames and/or to expose certain film frames in a special way. The microcomputer memorizes the ordinal numbers of such film frames and operates the copying device including the source 111, the filters 211, the duct 11, the objective 24 and the shutter 124 accordingly.

An important advantage of the improved method and apparatus is that the monitoring and copying operations are separated only in time but not in space. This renders it possible to monitor successive film frames at any desired speed and to thereupon reproduce the images of some or all of the film frames at a rate which can be selected at will, e.g., in dependency on the output of the selected copying device. An attendant is normally expected to be present during monitoring so as to intercede when the need arises (e.g. to identify those film frames which should not be copied or to identify those film frames which must be copied in a special way) but the copying operation can be carried out automatically so that the attendant can devote her or his time to the performance of other duties while the copying operation is in progress. As mentioned above, the attendant can take care of a completed customer order while the copying of the next customer film is in progress. Such completion of a customer order can involve inserting sections of customer film and prints into discrete pockets of a customer envelope, providing the envelope with information pertaining to the name and address of the customer, applying to the envelope information denoting the cost of the transaction and/or others.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of copying successive image carrying sections of a series of such sections on a length of photographic material, comprising the steps of advancing the length of photographic material longitudinally in a first direction; individually photoelectrically monitoring predetermined parameters of successive sections of said series in the course of said advancing step and generating and storing signals denoting characteristic values which are representative of said predetermined parameters; thereupon transporting the length of photographic material longitudinally in a second direction counter to said first direction; and reproducing the images of said sections in the course of said transporting step starting with the last monitored section and proceeding toward the first monitored section, including exposing the sections to copying light and influencing the copying light as a function of the respective stored signals.

2. The method of claim 1, wherein said advancing step includes moving the length of photographic material along a predetermined path and said monitoring step includes monitoring the parameters of successive sections in a predetermined portion of said path, said transporting step including moving the length of photographic material along said path and said reproducing step including exposing the sections to copying light in said predetermined portion of said path.

3. The method of claim 1, further comprising the step of photoelectrically ascertaining a predetermined parameter of said length of photographic material in the course of said advancing step and generating and storing an additional signal a characteristic value of which is indicative of the parameter of the length of photographic material, said influencing step further including influencing the copying light as a function of said additional signal.

4. The method of claim 1, further comprising the step of temporarily storing the length of photographic material upon completion of said advancing step and prior to start of said transporting step.

5. The method of claim 1, wherein said transporting step includes moving the length of photographic material stepwise and said exposing step takes place during intervals of dwell of the length of photographic material between successive stepwise movements in said second direction.

6. The method of claim 1, further comprising the step of converting successive monitored sections of the length of photographic material into a growing roll in the course of said advancing step.

7. Apparatus for copying successive image carrying sections of a series of such sections on a length of photographic material, comprising a transporting unit including means for advancing the length of photographic material longitudinally along a predetermined elongated path in opposite first and second directions; means for individually photoelectrically monitoring predetermined parameters of successive sections of said series during movement of such sections in said first direction, including means for generating and storing signals denoting characteristic values which are representative of said predetermined parameters; and means for reproducing the images of said sections during advancement of such sections in said second direction, starting with the last monitored section and proceeding toward the first monitored section, including a source of copying light, means for directing copying light from said source upon successive or selected sections of said length of photographic material, and means for influencing the copying light as a function of the respective stored signals.

8. The apparatus of claim 7, further comprising a support adjacent to a predetermined portion of said path, said advancing means being mounted on said support.

9. The apparatus of claim 7, further comprising a receptacle for temporary storage of the length of photographic material in convoluted condition adjacent to one end of said elongated path, said advancing means including means for withdrawing successive sections of the length of photographic material from said receptacle.

10. The apparatus of claim 9, wherein said receptacle includes a hollow cylinder.

11. The apparatus of claim 10 for copying sections of a length of photographic material having a predetermined width W, wherein the inner diameter of said hollow cylinder equals or exceeds 2 W.

12. The apparatus of claim 7, wherein said directing means includes means for directing light upon successive sections of the length of photographic material in a predetermined portion of said path and said monitoring means includes means for monitoring successive sections of the length of photographic material in said predetermined portion of said path.

13. The apparatus of claim 12, wherein said monitoring means includes means for activating said source of light during monitoring of successive sections in said predetermined portion of said path so that such source illuminates the sections which are being monitored during advancement of the length of photographic material in said first direction.

14. The apparatus of claim 7, wherein said reproducing means further includes means for focusing light which has passed through successive sections of the length of photographic material, said directing means and said focusing means being disposed at the opposite sides of said path and further comprising light intercepting means and means for moving said intercepting means between a first position in which said intercepting means is located between said path and said focusing means and prevents light from reaching said focusing means and a second position in which said focusing means receives light which has passed through a section of the length of photographic material.

15. The apparatus of claim 14, wherein said signal generating means comprises at least one photoelectric transducer and said intercepting means is arranged to direct light upon such transducer in said second position thereof.

16. The apparatus of claim 15, wherein said intercepting means comprises a mirror which is pivotable between said first and second positions.

17. The apparatus of claim 14, wherein said moving means comprises an electromagnet and a transmission interposed between said electromagnet and said intercepting means and arranged to move said intercepting means in response to changes in the condition of said electromagnet.

18. The apparatus of claim 17, wherein said electromagnet is a rotary electromagnet and said transmission includes a dead center transmission.

19. The apparatus of claim 17, wherein said electromagnet is activatable by said advancing means to effect the movement of said intercepting means to said first position only while said advancing means advances successive sections of the length of photographic material in said first direction.

20. The apparatus of claim 7, wherein said directing means is arranged to direct copying light upon successive sections in a predetermined portion of said path and said advancing means comprises a first material advancing unit at one side and a second material advancing unit at the other side of said portion of said path as considered in said first and second directions, said advancing means further comprising reversible motor means and means for transmitting motion from said motor means to said units.

21. The apparatus of claim 20, wherein each of said units comprises at least one roller.

22. The apparatus of claim 20, wherein said advancing means further comprises a rocker which supports said units and is pivotable about a predetermined axis between a first position in which one of said units engages and advances the length of material and a second position in which the material is advanced by the other of said units.

23. The apparatus of claim 22, wherein said motor means is mounted on said rocker and further comprising means for pivoting said rocker between said positions thereof.

24. The apparatus of claim 23, wherein said pivoting means comprises an electromagnet.

25. The apparatus of claim 24, wherein each of said units comprises an idler roller at one side of said path and a driven roller which is located at the other side of said path and is moved against the respective idler roller in response to pivoting of said rocker to the respective position.

26. The apparatus of claim 20, further comprising sensor means adjacent to said path and arranged to generate signals in response to detection of the trailing end of the length of photographic material during advancement in said first direction, said motor means being operative to reverse the direction of advancement of the length of photographic material from said first to said second direction in response to a signal from said sensor means.

27. The apparatus of claim 26, wherein said sensor means is adjacent to one of said units.

28. The apparatus of claim 20, further comprising sensor means adjacent to said path and arranged to generate signals in response to detection of the leader of the length of photographic material during advancement of such material in said second direction, said motor means being arranged to shift from transmission of motion from one of said units to transmission of motion to the other of said units in response to signals from said sensor means.

29. The apparatus of claim 28, further comprising a receptacle for the length of photographic material, said receptacle being adjacent to one end of said path and being arranged to receive successive sections of the length of photographic material during advancement in said first direction, said one unit being disposed between said predetermined portion of said path and said receptacle.

30. The apparatus of claim 7 for copying successive image carrying portion of a series of such sections on a length of photographic material which is provided with indicia denoting the positions of said sections, and further comprising sensor means for generating signals in response to detection of successive indicia, said advancing means being arranged to advance the material in said first and second directions in response to signals from said sensor means.

31. The apparatus of claim 7, wherein said transporting unit comprises several spaced-apart material advancing units including a first and a second advancing unit as considered in said first direction, and further comprising means defining an observation opening with a film frame indicator, a constant-speed material moving device and an indicia applying device in the region of said first unit.

* * * * *